(12) United States Patent
Koga

(10) Patent No.: US 6,369,922 B1
(45) Date of Patent: Apr. 9, 2002

(54) WAVELENGTH DIVISION MULTIPLEX OPTICAL TRANSMISSION APPARATUS

(75) Inventor: Tadashi Koga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/193,357

(22) Filed: Nov. 17, 1998

(30) Foreign Application Priority Data

Nov. 17, 1997 (JP) ............................................. 9-315252

(51) Int. Cl.[7] ................................................. H04J 14/02
(52) U.S. Cl. ........................ 359/124; 359/130; 359/180; 359/188
(58) Field of Search ................................ 359/124, 127, 359/130, 180, 188

(56) References Cited

FOREIGN PATENT DOCUMENTS

| GB | 2309131 | * | 7/1997 |
|---|---|---|---|
| JP | 9-64818 | | 3/1979 |
| JP | 56-103552 | | 8/1981 |
| JP | 60-43929 | | 3/1985 |
| JP | 5-110517 | | 4/1993 |
| JP | 9-167995 | | 6/1997 |
| JP | 9-261173 | | 10/1997 |
| JP | 9-326759 | | 12/1997 |

* cited by examiner

Primary Examiner—Thomas Mullen
(74) Attorney, Agent, or Firm—Scully, Scott, Murphy & Presser

(57) ABSTRACT

A wavelength division multiplex transmission apparatus capable of transmitting a plurality of 1.55 micron band signal light of different wavelengths by multiplexing the wavelengths is disclosed. A plurality of dispersion compensation units are serially connected, and each executes dispersion compensation with a particular signal light and outputs a respective compensated light. Such signal light output from the dispersion compensation units are combined and then output to a transmission path. Monitor light lying in a 1.3 micron band not susceptible to the operation of an optical direct amplifier is input to the serially connected dispersion compensation units. In each dispersion compensation unit, a photo-detector detects the level of the monitor light. With this configuration, the apparatus is capable of surely detecting faults including the defective connector connection or the shutoff of an optical patch code between the dispersion compensation units.

13 Claims, 5 Drawing Sheets

WAVELENGTH DIVISION MULTIPLEX OPTICAL TRANSMISSION APPARATUS

BACKGROUND OF THE INVENTION

The present invention relates to a wavelength division multiplex transmission apparatus and, more particularly, to a wavelength division multiplex transmission apparatus capable of compensating for wavelength dispersion on a transmission path.

Generally, in a wavelength division multiplex transmission system, an optical transmission apparatus includes N optical transmitters respectively emitting signal light having wavelengths λ1 through λ1 N. After the wavelengths of the signal light have been multiplexed, dispersion compensation units located at the transmission side compensate for the wavelength dispersion on a transmission path. Because the amount of dispersion compensation necessary for implementing required transmission quality differs from one wavelength to another wavelength, N different dispersion compensation units are necessary for a wavelength division multiplex transmission system handling N different waves to execute optimal dispersion compensation.

The above transmission system includes N optical transmitters each using a 1.55 micron band semiconductor laser as a light source, a coupler for combining light output from the transmitters, N dispersion compensation units serially connected to the coupler, and another coupler for combining light output from the dispersion compensation units. Each dispersion compensation unit includes a dispersion compensating section, an optical direct amplifier, and a splitter for separating only light having a particular wavelength λx (x=1–N). With these structural elements, each dispersion compensation unit executes optimal dispersion compensation with one of the input combined light having a particular wavelength and separates and outputs the light having the particular wavelength.

It is a common practice with the above system to connect the optical transmitters, dispersion compensation units and so forth by connector connection using an optical patch code. Each dispersion compensation unit therefore includes a monitor circuit for monitoring the level of the 1.55 micron band signal light and thereby detecting an error degrading transmission quality, e.g., defective connector connection or the shutoff of the patch code.

However, the problem with the transmission apparatus of the kind described is that the level of the signal light differs from one connecting section to another connecting section in a complicated manner due to, e.g., optical pre-emphasis which sets particular signal light level for each wavelength and outputs such wavelengths to a transmission path. It is therefore extremely difficult to set a single threshold level in order to monitor errors in the level of signal light ascribable to, e.g., defective connection between the units or the shutoff of the patch code.

SUMMARY OF THE INVENTION

It is therefore an object of the present invention to provide a simple, low cost wavelength division multiplex transmission apparatus capable of detecting an error occurred at any connecting section easily and reliably.

In accordance with the present invention, a wavelength division multiplex optical transmission apparatus for transmitting a plurality of signal light of different wavelengths by multiplexing the wavelengths includes a plurality of optical transmitters each for outputting signal light having a particular wavelength. A first coupler combines signal light output from the plurality of optical transmitters. A plurality of dispersion compensation units respectively execute dispersion compensation with the signal light combined by the first coupler and separate the respective compensated signal light. A light source outputs light having a preselected wavelength to be input to the plurality of dispersion compensation units. A plurality of photo-detectors each detects the level of the light having the preselected wavelength. A second coupler combines signal light respectively separated by the plurality of dispersion compensation units.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENT

To better understand the present invention, brief reference will be made to a conventional wavelength division multiplex optical transmission apparatus. As shown, the transmission apparatus includes a plurality of optical transmitters 2-1 through 2-N each using a 1.55 micron band semiconductor laser as a light source. A coupler 3 combines light output from the optical transmitters 2-1 through 2-N. A plurality of dispersion compensation units 6-1 through 6-N are serially connected to the coupler 3. A coupler 7 combines light output from the dispersion compensation units 6-1 through 6-N. Each of the dispersion compensation units 6-1 through 6-N has a dispersion correcting section, an optical direct amplifier, and an optical separator for separating only light having a wavelength λx (x=1 through N). Each of the dispersion compensation units 6-1 through 6-N includes a monitor circuit for monitoring the level of the 1.55 micron band signal light. With the monitor circuit, it is possible to detect faults including the defective connector connection and the shutoff of an optical patch code. However, because the signal light of different wavelengths are not identical in level at each connecting section, it is difficult to detect the errors in the level of the individual signal light.

Figure 1:
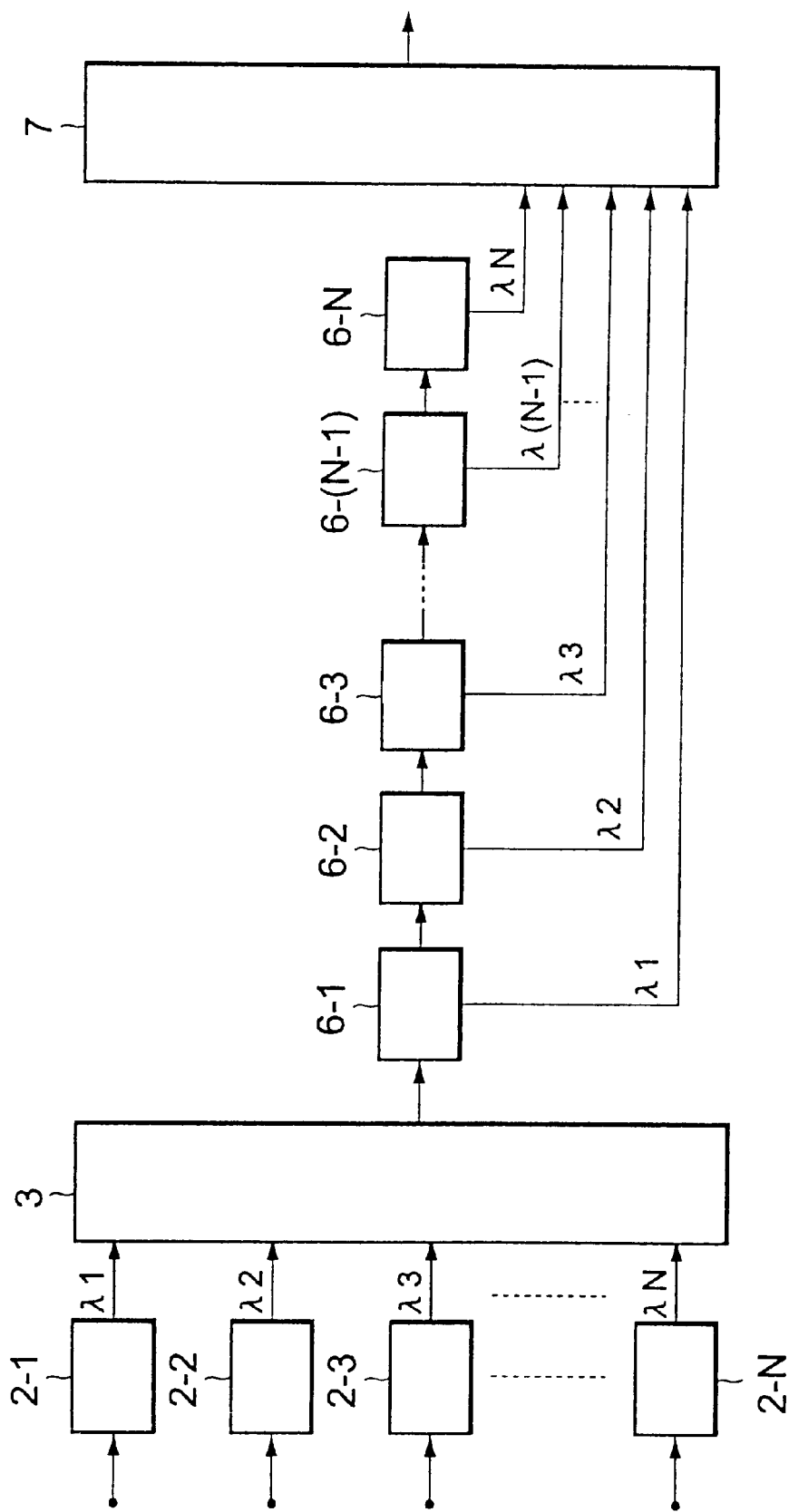
FIG. 1 is a block diagram schematically showing a conventional wavelength division multiplex optical transmission apparatus.
Figure 2:
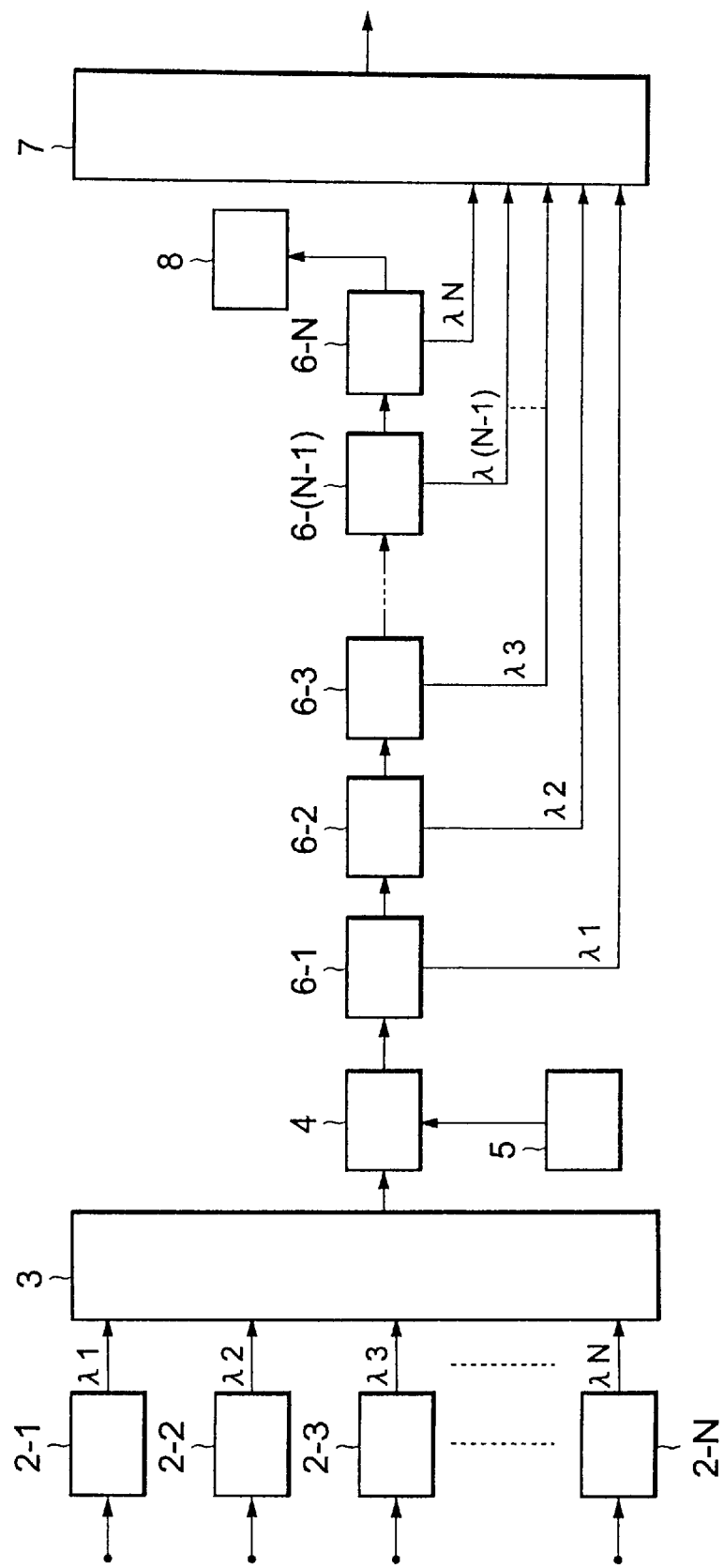
FIG. 2 is a schematic block diagram showing a wavelength division multiplex optical transmission apparatus embodying the present invention.

Referring to FIG. 2, a wavelength division multiplex optical transmission apparatus embodying the present invention will be described. As shown, the transmission apparatus includes optical transmitters 2-1 through 2-N. The optical transmitters 2-1 through 2-N each includes a respective light source in the form of, e.g., a 1.55 micron band InGaAs/InP distributed feedback type semiconductor laser and an LiNbO$_3$ (LN) intensity modulator. N signal light outputs from the optical transmitters 2-1 through 2-N and having wavelengths λ1 through λN, respectively, are input to a coupler 3 implemented by, e.g., an AWG (Arrayed Waveguide Grating Multiplexer). A coupler 4 is connected to the output of the coupler 3. The coupler 4 combines the combined N signal light outputs and path monitor light output from a monitor light source 5 and lying in a 1.3 micron band and feeds the resulting combined light to a serial connection of dispersion compensation units 6-1 through 6-N. The dispersion compensation units 6-1 through 6-N compensate for the dispersion of the combined signal light output from the coupler 4 and respectively separate and output the N signal light outputs having the wavelengths λ1 through λN, respectively. A coupler 7 again combines the separated signal light output from the dispersion compensation units 6-1 through 6-N. A monitor circuit 8 is connected to one output of the last dispersion compensation unit 6-N.

Figure 3:
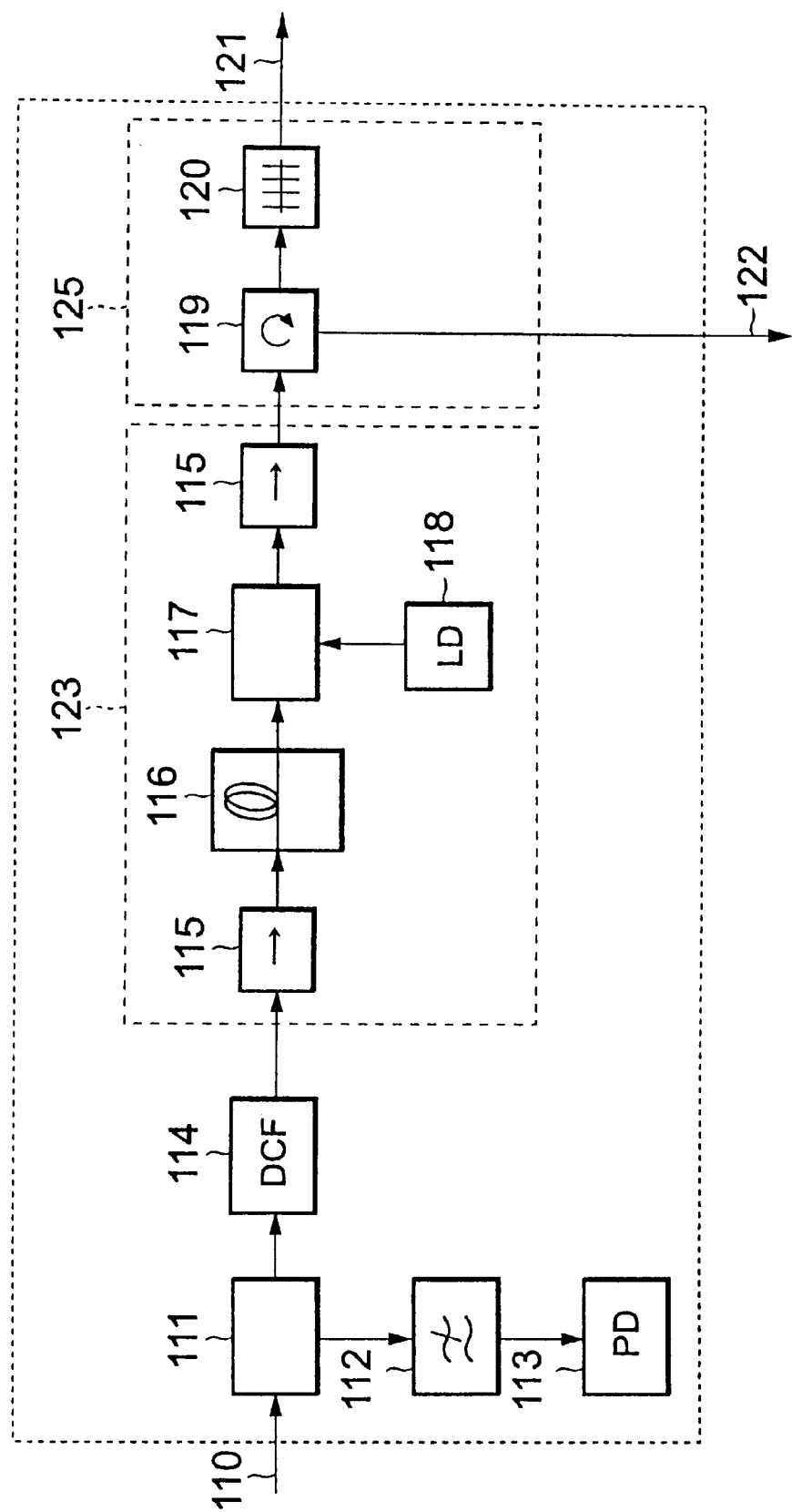
FIG. 3 is a block diagram schematically showing a specific configuration of a dispersion compensation unit included in the illustrative embodiment.

FIG. 3 shows a specific configuration of one of the dispersion compensation units 6-1 through 6-N. As shown, the compensation unit includes a splitter 111 to which the combined light outputs. An optical filter 112 and a photodetector (PD) 113 are connected to a first output of the splitter 111. A dispersion compensation fiber (DCF) 114 is connected to a second output of the splitter 111. A serial connection of an optical direct amplifier 123 and a signal light separator 125 is connected to the DCF 114. The optical direct amplifier 123 is made up of an InGaAs/InP Fabry-Perot type semiconductor laser 118, a coupler 117, and erbium doped fiber amplifier (EDFA) 116. The separator 125 is implemented by an optical fiber grating or fiber Bragg grating (FBG) 120 and an optical circulator 119 by way of example. While the FBG 120 reflects only light having a particular wavelength, the circulator 119 separates only the light reflected by the FBG 120.

In operation, the optical transmitters 2-1 through 2-N output signal light having the wavelengths λx (x=1–N), respectively. The coupler 3 combines the signal light output from the transmitter 2-1 through 2-N and feeds the resulting combined signal light to the coupler 4. the coupler 4 combines the input combined light and the 1.3 micron band, path monitor light output from the monitor light source 5. The combined light output from the coupler 4 are sequentially propagated through the dispersion compensation units 6-1 through 6-N. The dispersion compensation unit 6-1 executes optimal dispersion compensation with, among the combined light, only the light having the wavelength λ1 and separates and outputs the compensated light. Likewise, the dispersion compensation unit 6-2 executes optimal dispersion compensation with only the light having the wavelength λ2 and separates and outputs the compensated light. The dispersion compensation units 6-3 through 6-N operate in the same manner except that they deal with the signal light having the wavelengths λ3 to λN, respectively. The compensated signal light output from the units 6-1 through 6-N are again combined by the coupler 7.

More specifically, in the dispersion compensation unit 6-1, the combined signal lights are split by the splitter 111 into two. The optical filter 112 connected to the splitter 111 separates the 1.3 micron band path monitor light from one part of the two split light outputs. The PD 113 detects the level of the path monitor light so as to monitor the variation of the level. A second part of the split light output from the splitter 111 is input to the DCF 114. The DCF 114 optimally compensates for the dispersion of only the signal having the wavelength λ1. The DCF 114 has a dispersion value opposite in sign to the wavelength dispersion of an optical fiber constituting a transmission path and is so adjusted in length as to optimally compensate for the dispersion of the λ1 signal light. The signal lights output from the DCF 114 are amplified by the optical direct amplifier 123. The FBG 120 reflects only the λ1 signal light contained in the amplified signal light. The reflected λ1 signal light is separated by the optical circulator 119 as separated light 122. This separated light 122 is output from the dispersed compensation unit 6-1. The plurality of signal light are input to the next dispersion compensation unit 6-2 as output light 121. The dispersion compensation unit 6-2 operates in the same manner as the dispersion compensation unit 6-1.

Figure 4:
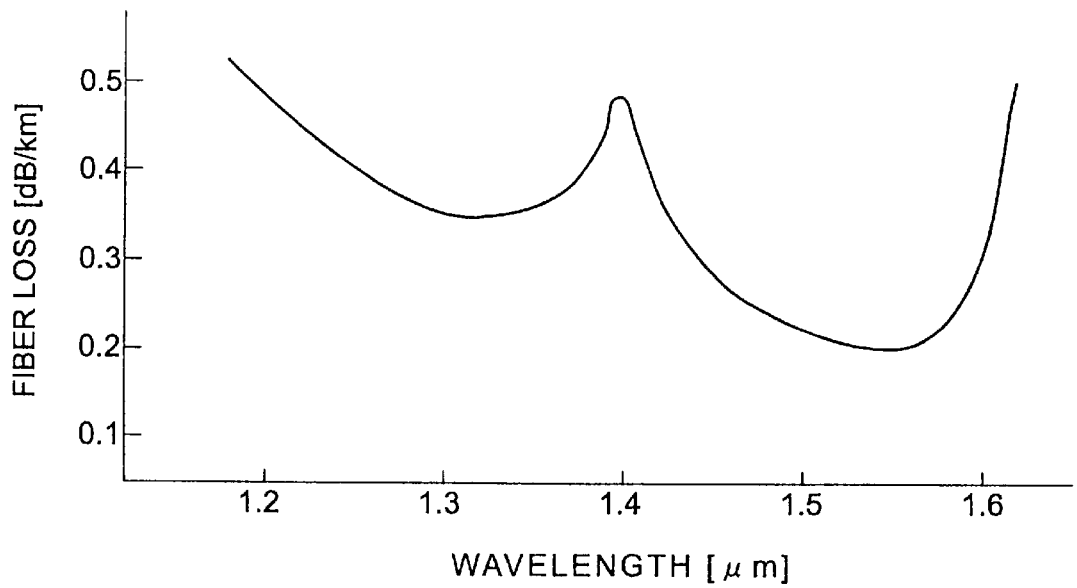
FIG. 4 shows a relation between the loss of a 1.3 micron, zero dispersion fiber and the wavelength.
Figure 5:
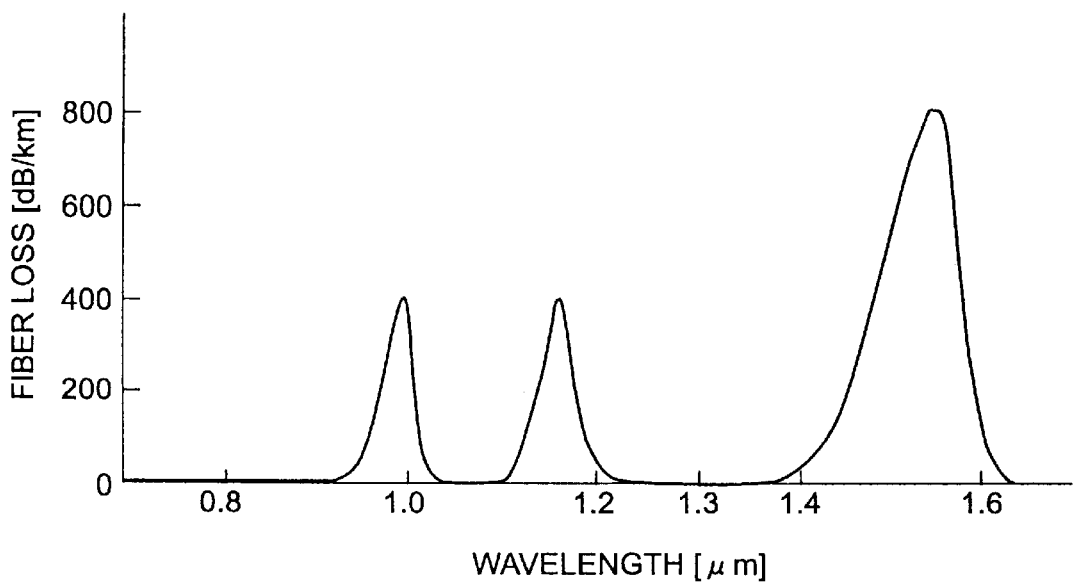
FIG. 5 shows relation between the loss of an erbium doped fiber (EDF) and the wavelength.

FIG. 4 shows a relation between the loss of a 1.3 micron, zero dispersion fiber implementing the DCF 114 and the wavelength. FIG. 5 shows a relation between the loss of an erbium doped fiber (EDP) implementing the optical direct amplifier 123 and the wavelength. As FIGS. 4 and 5 indicate, an EDF has hardly any influence on the 1.3 micron band monitor light despite attenuation ascribable to scattering other than Rayleigh scattering and amplification using induced emission. As a result, the monitor light is sequentially propagated through the dispersion compensation units 6-1 through 6-N and between the units 6-1 through 6-N in accordance with a level diagram based on a certain preselected loss. The monitor light obtains fixed optical power at the inlet or the outlet of each dispersion compensation unit. Therefore, when an error deteriorating the transmission quality of signal light e.g., defective connector connection or the shutoff of an optical pack code occurs, a position where the error has occurred can be easily located. This provides the transmission apparatus with high reliability despite a simple configuration.

Figure 6:
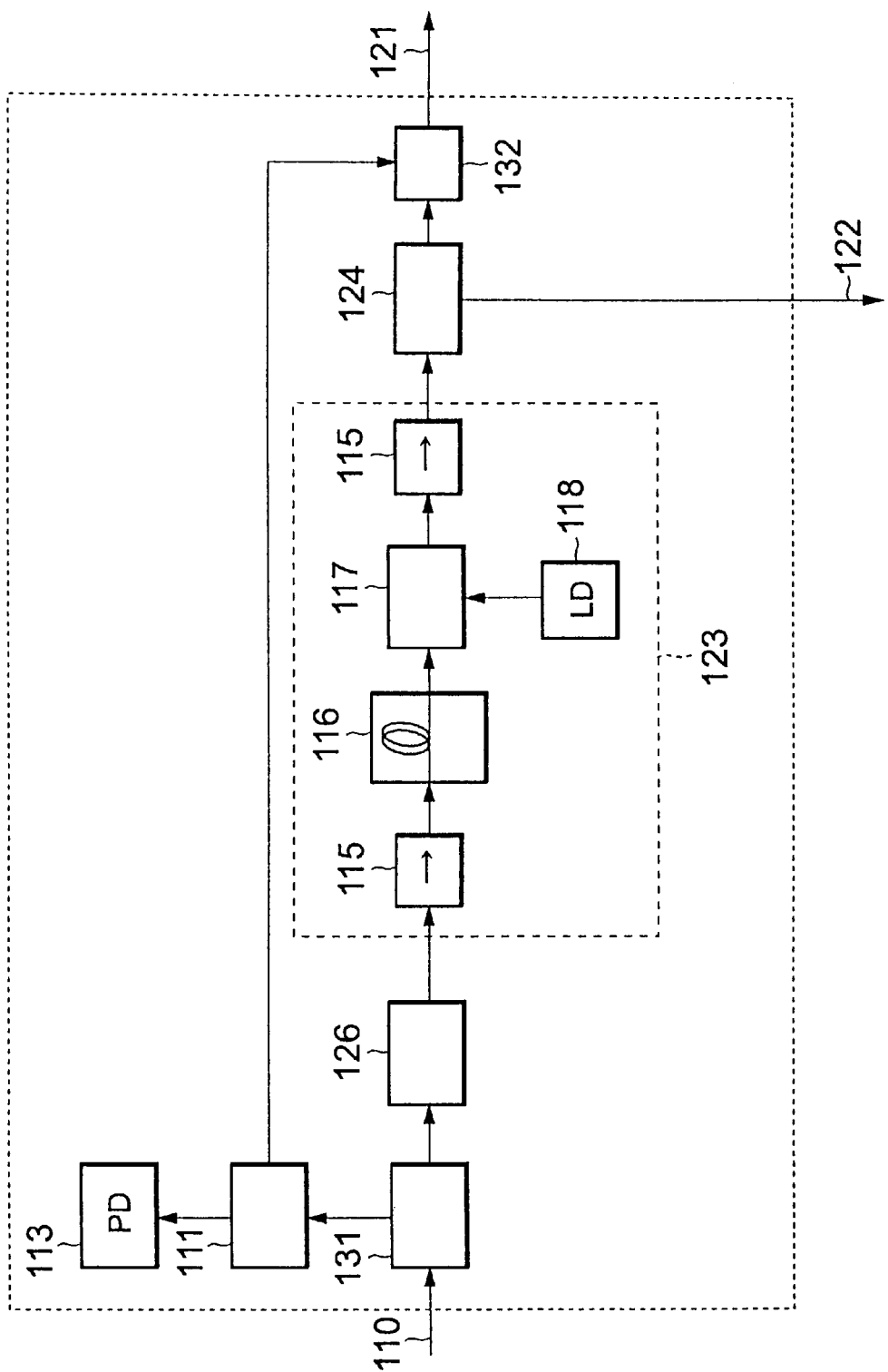
FIG. 6 is a schematic block diagram showing another specific configuration of the dispersion compensation unit included in the illustrative embodiment.

FIG. 6 shows another specific configuration of the dispersion compensation unit. As shown, the dispersion compensation unit includes a splitter 131 for splitting the input signal light 110 to the signal light lying in the 1.55 micron band and the path monitor light lying in the 1.3 micron band. A splitter 111 splits the 1.3 micron band monitor light into two. A light shutoff detection circuit including InGaAs PD 113 detects the level of one of the two split monitor light output from the splitter 111. The other split monitor light is input to a coupler 132. On the other hand, the 1.55 micron band signal lights are input to an optical fiber grating (FBG) 126 having a dispersion value opposite in sign to the wavelength dispersion of the transmission path fiber and executing dispersion compensation. The signal light subjected to dispersion compensation is amplified by an EDFA 122 and then input to an optical grating device 124. The grating device 124 reflects only light having a particular wavelength and thereby outputs separated light 122. A coupler 132 again combines the 1.3 micron band monitor light split by the splitter and the 1.55 micron band signal light.

In the illustrative embodiment, the monitor light has a wavelength lying in the 1.3 micron band in relation to the signal light whose wavelength lies in the 1.55 micron band. In the case where the wavelengths of the signal light do not lie in the 1.55 micron band, use may be made of monitor light having any other suitable wavelength not susceptible to or little susceptible to, e.g., the operation of an optical direct amplifier.

While the present invention has been described with a certain preferred embodiment, it is to be understood that the subject matter encompassed by the present invention is not limited to the specific embodiment. On the contrary, it is intended to include all alternatives, modifications, and equivalents as can be included within the spirit and scope of the following claims.

What is claimed is:

1. A wavelength division multiplex optical transmission apparatus for transmitting a plurality of signal lights of different wavelengths by multiplexing the wavelengths, said apparatus comprising;

a plurality of optical transmitters each for outputting signal light having a particular wavelength;

a first coupler for combining signal light output from said plurality of optical transmitters;

a plurality of dispersion compensation units for respectively executing dispersion compensation with the signal light combined by said first coupler and separating respective compensated signal light;

a light source for outputting light having a preselected wavelength to be input to said plurality of dispersion compensation units;

a plurality of photo-detectors each for detecting a level of the light having the preselected wavelength; and a second coupler for combining signal light respectively separated by said plurality of dispersion compensation units.

2. An apparatus as claimed in claim 1, further comprising a third coupler for combining the signal light output from said first coupler and the light output from said light source.

3. An apparatus as claimed in claim 1, wherein said plurality of dispersion compensation units are serially connected.

4. An apparatus as claimed in claim 3, wherein a single photo-detector responsive to a level of the light having the preselected wavelength is connected to a last one of said dispersion compensation units.

5. An apparatus as claimed in claim 1, wherein said dispersion compensation units each executes optimal dispersion compensation with a particular one of the signal lights input thereto.

6. An apparatus as claimed in claim 1, wherein said dispersion compensation units each comprise:

an optical detecting section for detecting the light having the preselected wavelength;

a dispersion compensating section for executing dispersion compensation with the signal light;

an optical direct amplifier; and a separating section for separating the signal light having a particular wavelength.

7. An apparatus as claimed in claim 6, wherein said optical detecting section comprises:

a splitter for splitting the signal light input thereto;

an optical filter for transmitting the signal light having the preselected particular wavelength; and a light receiving section for detecting a level of the signal light having the preselected wavelength.

8. An apparatus claimed in claim 6, wherein said separating section includes an optical fiber grating for reflecting only the light having the particular wavelength.

9. An apparatus as claimed in claim 6, wherein said separating section comprises:

an optical fiber grating for reflecting only light having a particular wavelength; and an optical circulator for separating only the light reflected by said optical fiber grating.

10. An apparatus as claimed in claim 6, wherein said dispersion compensating section comprises a dispersion compensation fiber.

11. An apparatus as claimed in claim 6, wherein said dispersion compensating section comprises an optical fiber grating.

12. An apparatus as claimed in claim 6, wherein said optical detecting section comprises:

a splitter for separating the light having the preselected wavelength from input light;

a light receiving section for detecting a level of the light having the preselected wavelength;

a splitter for separating a part of the light having the preselected wavelength; and a coupler for combining a part of the separated light having the preselected wavelength and the signal light.

13. An apparatus as claimed in claim 1, wherein the signal lights lie in a 1.55 micron band while the light having the preselected wavelength and input to said dispersion compensation units lies in a 1.3 micron band.

* * * * *